(12) United States Patent
Shelby et al.

(10) Patent No.: US 6,839,652 B2
(45) Date of Patent: Jan. 4, 2005

(54) METHOD AND DEVICE FOR PREDICTING TEMPERATURE PROFILES THROUGHOUT THE THICKNESS OF A POLYMER PREFORM

(75) Inventors: Marcus David Shelby, Kingsport, TN (US); Kevin Douglas Horton, Surgoinsville, TN (US); Harry Probert Hall, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/628,178

(22) Filed: Jul. 28, 2003

(65) Prior Publication Data

US 2004/0024560 A1 Feb. 5, 2004

Related U.S. Application Data

(63) Continuation-in-part of application No. 10/090,242, filed on Mar. 4, 2002, now abandoned.

(51) Int. Cl.[7] .............................................. G06F 19/00
(52) U.S. Cl. ........................ 702/130; 702/30; 264/535; 425/522
(58) Field of Search ................... 702/130, 30; 425/4 R, 425/522; 264/531, 535

(56) References Cited

U.S. PATENT DOCUMENTS

| | | | | |
|---|---|---|---|---|
| 5,869,110 A | * | 2/1999 | Ogihara | 425/526 |
| 6,019,933 A | * | 2/2000 | Takada et al. | 264/532 |
| 6,783,349 B2 | * | 8/2004 | Neavin et al. | 425/133.5 |

* cited by examiner

*Primary Examiner*—Kamini Shah
(74) *Attorney, Agent, or Firm*—Dennis V. Carmen; Bernard J. Graves, Jr.

(57) ABSTRACT

A method for determining the temperature distribution throughout the thickness of a preform used in a container reheat stretch blow molding process by measuring the outside surface temperature of a preform or series of preforms at least two times during the period the preform is cooling down after exiting the heat station and before entering the blow molding station in the blow molding machine and calculating the temperature distribution throughout the thickness of the preform based upon the measured outside surface temperatures using a novel algorithm.

23 Claims, 9 Drawing Sheets

METHOD AND DEVICE FOR PREDICTING TEMPERATURE PROFILES THROUGHOUT THE THICKNESS OF A POLYMER PREFORM

This application is a Continuation-In-Part of U.S. Ser. No. 10/090,242, filed Mar. 4, 2002 now abandoned.

BACKGROUND OF THE INVENTION

1. Field of the Invention

This invention relates generally to methods for producing polyester containers and particularly to methods for determining the temperature distribution throughout the thickness of a polyester preform used in a reheat stretch blow molding process for making polyester containers.

2. Description of the Prior Art

The containers used to package many consumer products are made from polyester, particularly poly (ethyleneterephthalate) ("PET"). The process for producing such containers involves making a PET preform and reheat stretch blow molding the preform into a container, typically a bottle. These containers must have properties that permit them to function in the product manufacturing or packaging process and be capable of maintaining the integrity of the product in the container for prolonged periods. The container properties of most interest are typically the strength of the container, the permeability of the container to liquids and gases, and the haze (optical properties) of the final bottle. All of these parameters are a strong function of the preform temperature distribution at the time of blow molding. Using carbonated soft drinks as an example, the high pressure of $CO_2$ in the container tends to cause the bottle to undesirably expand or "creep" over time. Similarly, the $CO_2$ tends to permeate through the bottle sidewall until a point is reached where the soda goes "flat." Both the creep resistance and the gas barrier can be improved by blowing the bottle at a colder temperature which improves the molecular orientation and strain-induced crystallization of the polyester chains. However, too cold of a stretch temperature and localized microtearing or "pearlescense" will occur.

The final properties of a stretch blow molded container are a strong function of the blow molding temperature. Because the inside and outside surfaces of a preform undergo differing degrees of stretch as the container is produced, it is important to optimize the blow temperature at both surfaces as well as through the center. For example, the inside surface of a typical preform might undergo a planar stretch ratio ("PSR") of 11 whereas the outside surface PSR is only 9. Since the inside surface is stretched more than the outside surface, the inside surface should preferably be a few degrees hotter at inflation to prevent pearlescence (microtearing due to cold stretching) and to optimize the overall molecular or chain orientation.

Unfortunately, the ability to optimize the blow molding temperature has been hindered by the inability to determine the through-the-thickness temperature profile of the preform, i.e., the temperature at the inside and outside surfaces as well as the temperature throughout the preform body. Most reheat stretch blow molding machines ("RHB") are equipped with, at most, a standard infrared ("IR") pyrometer that measures only the outside surface temperature of the preform. Unfortunately, the inside surface temperature of the preform is actually more important for determining bottle properties. If too low, the inside surface will micro-tear during stretching resulting in a hazy bottle. If too hot, the inside surface will not strain-harden properly resulting in poor mechanical properties, e.g., reduced oxygen barrier.

With some effort, a preform can be removed from the blow molding process and a probe inserted inside the preform to obtain a rough estimate of the inside surface temperature. Unfortunately, this method is not very accurate. Also, this approach does not give the full temperature profile over the whole preform thickness and height. Furthermore, this approach is not conducive to real-time measurement and control because the preform must be removed from the manufacturing process for testing. The best alternative is to run costly trial-and-error type blow molding trials where the heating lamps are systematically varied until the optimal bottle properties are obtained. Unfortunately, this procedure is time consuming and expensive. More often than not, the blow molding process will be conducted at whatever conditions meet the minimum fitness for use specifications for a particular container, whether or not these are truly optimal for producing the highest quality containers.

There is, therefore, a need for a method and device for determining the temperature distribution throughout the thickness of a preform, particularly in real-time, and using such temperature distribution data to improve the container manufacturing process and ensure that only the highest quality containers are produced.

SUMMARY OF THE INVENTION

It is, therefore, an object of the invention to provide a method and device for determining the temperature distribution throughout the thickness of a preform used in a reheat stretch blow molding process for making polyester containers.

It is another object of the invention to provide a reheat stretch blow molding machine for producing high quality polyester containers.

It is another object of the invention to provide high quality polyester containers.

It is a further object of the invention to provide an optimized reheat stretch blow molding process for producing polyester containers.

These and other objects are achieved using a method and device for determining the temperature distribution throughout the thickness of a preform used in a polyester container reheat stretch blow molding process. The method comprises measuring the outside surface temperature of a preform or series of preforms at least two times during the period the preform is cooling down after exiting the heat station and before entering the blow molding station in the blow molding machine and calculating the temperature distribution throughout the thickness of the preform based upon the measured outside surface temperatures using an algorithm comprising curve fitting the measured outside surface temperatures to solve for $A_n$ using an equation having the formula $$T(0, t) = Tc + \sum_{n=1}^{\infty} A_n e^{-z_n^2 \alpha t}(z_n k / h)$$

and using the $A_n$ values to calculate the through-the-thickness temperature distribution for the preform using an equation having the formula $$T(x,t) = Tc + \sum_{n=1}^{\infty} A_n e^{-z_n^2 \alpha t} v_n(x),$$

where T(x,t) is the through-the-thickness temperature distribution of the present invention, T(0,t) is the outside temperature as a function of time t which is curvefit to the experimental data to determine the unknown front factors $A_n$, Tc is the ambient air temperature, e is the exponential equal to 2.718, $v_n$ are the eigenvectors for the nth eigenvalue $z_n$, k is conductivity, x is the depth of the preform from the outside surface, and α is the thermal diffusivity.

The device comprises a temperature measuring means for measuring the outside surface temperature of a preform or series of preforms at least two times during the period the preform is cooling down after exiting the heat station and before entering the blow molding station in the blow molding machine and a calculating means for calculating the temperature distribution throughout the thickness of the preform based upon the measured outside surface temperatures, wherein the calculating means calculates the temperature distribution using the novel algorithm of the present invention.

The method and device are useful for producing high quality polyester containers used to package various foods and beverages.

Other and further objects, features and advantages of the present invention will be readily apparent to those skilled in the art.

DETAILED DESCRIPTION OF THE INVENTION

Figure 1:
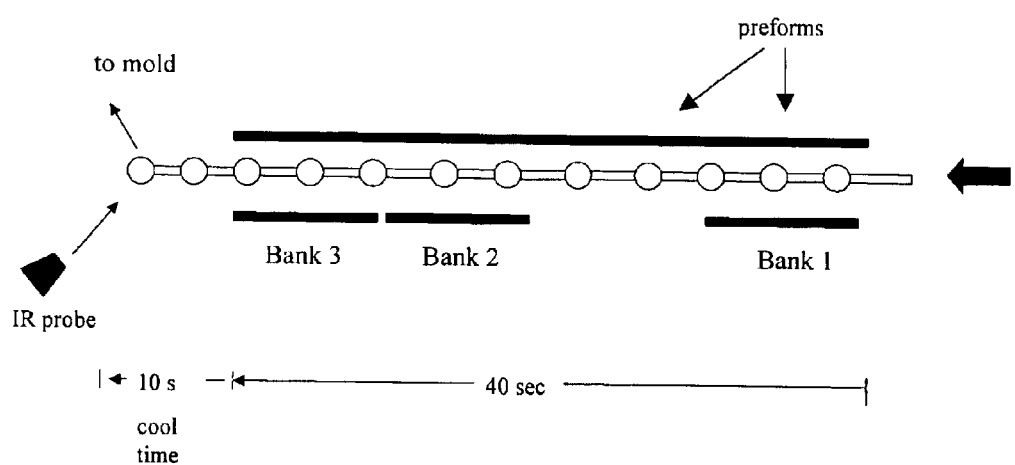
FIG. 1 is a schematic of a typical reheat blow machine (Sidel SB23) with standard pyrometer mounting.

The term "preform" as used herein is defined to include monolayer preforms and multilayer preforms made from two or more polymers suitable for use in the reheat stretch blow molding process for making containers. Preferably, at least one of the layers in a multilayer preform is a polyester or copolyester although any reheat stretch blow moldable polymer is acceptable. The term also includes preforms containing antiblocks, colorants, stabilizers, and other additives.

In one aspect, the present invention provides a method for determining the temperature distribution throughout the thickness of a polyester preform used in a polyester container reheat stretch blow molding process from temperature measurements taken from the outside surface of the preform. The outside surface temperature of the preform is measured at least two times during the period the preform is cooling down after exiting the heat station and before entering the blow molding station in the blow molding machine. The temperature data gathered from these measurements are used to calculate the temperature distribution throughout the thickness of the preform using the novel algorithm described herein. The calculated preform temperature distribution is used to produce a polyester preform having a temperature distribution optimized for the production of high quality polyester containers.

The method is an "inverse" method because the starting temperature profile is determined by measuring the preforms future cooling behavior. The method provides very accurate preform temperature distribution data based upon only a small amount of outside surface temperature data. The method, therefore, can be used for online, real-time process control to ensure that high quality bottles are made from the preforms.

In another aspect, the present invention provides a device for determining the temperature distribution throughout the thickness of a polyester preform used in a polyester container reheat stretch blow molding process from temperature measurements taken from the outside surface of the preform. The device comprises a temperature measuring means for measuring the outside surface temperature of the preform at least two times during the period the preform is cooling down after exiting the heat station and before entering the blow molding station in the blow molding machine and a calculating means for calculating the temperature distribution throughout the thickness of the preform based upon the measured outside surface temperatures, wherein the calculating means calculates the temperature distribution using the novel algorithm of the present invention.

In one embodiment, a preform is removed from the blow molding process and temperature measurements taken from the outside surface of the preform as a function of cooling time using standard equipment well known to skilled artisans, preferably thermocouples, pyrometers, or infrared (IR) imaging cameras coupled to a computer for recording and displaying the temperature data in a human readable format. The preform can be ejected from the blow molding machine and manually placed in front of the pyrometers, or, the whole device can be mounted in such a way that the blow molding machine automatically transfers the preforms to a separate station where the pyrometers can measure the temperature. The latter example essentially involves a modified "offline" approach that is built into the blow molding machine. After measurement, the preform could be either ejected for recycle purposes, or if still hot enough, could be sent on to the blow molding station. The data is used in the novel algorithm to determine the temperature distribution throughout the thickness of the preform. The calculations can be preformed manually, using a calculator, with a computer, or other method known to skilled artisans.

In another embodiment, a series of temperature measurement instruments are placed adjacent to the preforms as they exit the heat station in the blow molding machine. At least two such devices are used. The temperature measurement instruments measure the temperature of the preforms as they move from the heat station to the blow molding station in the blow molding machine. The temperature measurements are not taken from a single preform but from a series of preforms moving through the blow molding process. The data is collected using any known means and used in the algorithm to determining the temperature distribution throughout the thickness of a preform. In a preferred embodiment, the series of temperature measurement instruments are coupled to a computer programmed to compute the temperature distribution using the algorithm of the present invention. This embodiment essentially gives real-time data that can be used to adjust the reheat process and control the temperature distribution of the preform and therefore the quality of the container. In a most preferred embodiment, such computer is coupled to the heating elements in the heat station and automatically adjusts the reheat process based upon the acquired data to ensure that the preform temperature is optimized for producing a high quality container.

In another embodiment, a thermal imaging camera is used to take infrared ("IR") snapshots of the preforms as they exit the heat station and before they enter the blow molding station. The image should capture at least two preforms within its field of view. The snapshots are used to determine the temperature of the preforms as they move from the heat station to the blow molding station. The temperature measurements are not taken form a single preform but from a series of preforms moving through the blow molding process. The data is collected using any known means and used in the algorithm to determining the temperature distribution throughout the thickness of a preform. In a preferred embodiment, the IR camera(s) are coupled to a computer programmed to compute the temperature distribution using the algorithm of the present invention. The data can be collected using a single IR camera that takes a snapshot of two or more preforms or can be collected using multiple IR cameras. The surface temperature is determined based upon the digital image from the camera and the temperature data is used in the algorithm to determine the temperature distribution throughout the thickness of a preform. This embodiment essentially gives real-time data that can be used to adjust the reheat process and control the temperature distribution of the preform and therefore the quality of the container. As above, in a most preferred embodiment, such computer is coupled to the heating elements in the heat station and automatically adjusts the reheat process based upon the acquired data.

When desired, the preform inside surface temperature is determined by collecting a preform, inserting a thermometer, pyrometer, or similar device inside the preform, and manually measuring the temperature.

In another aspect, the present invention provides a reheat stretch blow molding machine having a heat station where preforms are heated; a blow molding station where preforms are converted to containers; a means for transporting the heated preforms from the heat station to the blow molding station at an essentially uniform rate; a temperature measuring means for measuring the outside surface temperature of the preform at least two times during the period the preform is cooling down after exiting the heat station and before entering the blow molding station; and a calculating means for calculating the temperature distribution throughout the thickness of the preform based upon the measured outside surface temperatures.

The temperature measuring means is coupled to a calculating means capable or receiving the measured temperature data. The calculating means receives data from the temperature measuring means and calculates the preform temperature distribution using the novel algorithm of the present invention. The calculating means is coupled to the heat station in a manner that permits the calculating means to adjust the heat station heating elements (lamps or similar heating elements) based upon the calculated temperature distribution. This real-time collection of preform surface temperature data, calculation of preform temperature distribution based upon the preform surface temperature data, and use of the calculated data to control the heat station heating elements permits the machine to adjust and control the temperature distribution throughout the thickness of a preform in the heat station.

The present method and device permits reheat stretch blow molding machines to be designed to automatically adjust reheat temperatures for optimum blow molding conditions. Such machines can be manufactured with the temperature measuring devices (multiple pyrometers or IR cameras) and computing devices (computer programmed with the algorithm of the present invention and coupled to reheat elements and temperature measuring devices) integrated into the machines. These blow molding machines automatically adjust the reheat process to optimize preform temperatures and ensure a high quality blow molded container. Choosing preform temperatures for a particular preform to be used in the blow molding process is within the purview of the skilled artisan based upon the chemical and physical properties of a particular polyester preform.

Although polyesters and copolyesters are the preferred polymer, any polymer or combinations of polymers that can be used in a reheat stretch blow molding process will function in the present invention. Preferred polymers include nylon (e.g. nylon 6, nylon 6/6, metaxylene diamine (MXD6)), polycarbonates, acrylonitrile, polyvinyl chloride (PVC), polyolefins (polypropylene, polyethylene and their copolymers), ethylene-vinyl alcohol (EVOH), styrenics, and combinations thereof, whether by blending or by multilayer preform.

Stretch Blow Molding Reheat Process

Figure 2:
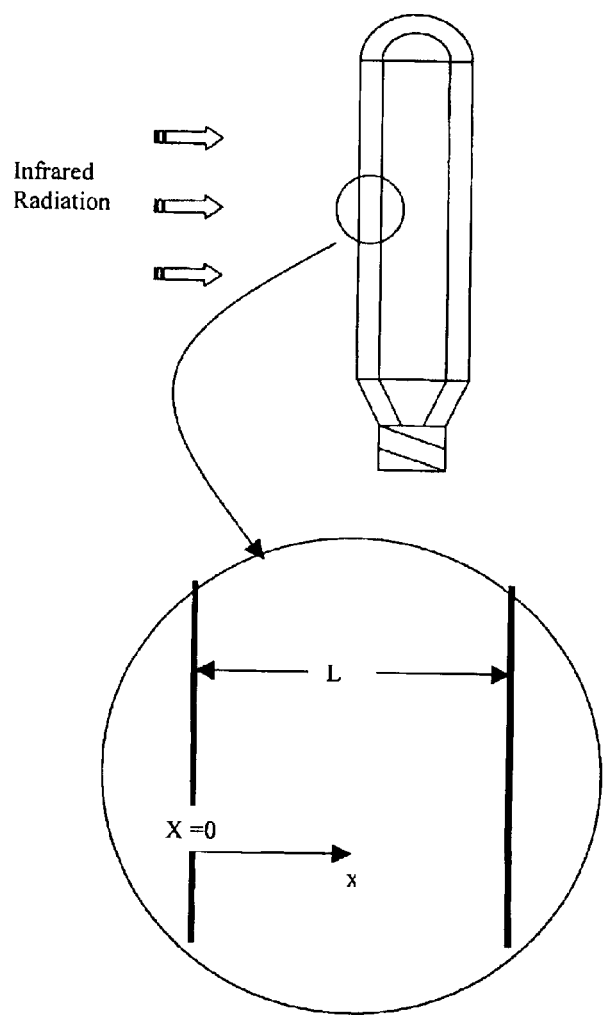
FIG. 2 is a schematic of the preform and coordinates used in the algorithm of the present invention.

The reheat process used in a reheat stretch blow molding process must be understood and controlled to achieve the present invention. A schematic of a typical reheat blow machine ("RHB") is shown in FIG. 1 (in this case a Sidel SBO 23 which is typical of commercial machines although smaller). Preforms pass through a series of heater banks or elements before exiting the heat station and entering the blow molding station. Heater elements are typically infrared quartz heaters that emit radiation in the visible and infrared regions. A polyester preform is "semi-transparent" to this radiation so much of it penetrates deeply into the preform before being absorbed, heating the thick preform almost uniformly in much the same way as a microwave oven heats food through and through. Thus, as shown in FIG. 2, the radiation hits the preform having thickness L, on the outside surface (x=0) and passes through with most being absorbed before reaching the inside wall (x=L). As the preform exits the lamps, a single pyrometer is often used to measure the surface temperature of the preform (x=0). This temperature is used to control the RHB and is most often the "design parameter" around which a preform is heated and blown. However, it is quite possible for two different sets of reheat conditions to give the same outside surface temperature, but different inside surface temperatures.

During reheating, a large volume of cooling air is also passed across the preforms to keep the surface (x=0) from overheating. This in turn, further distorts the overall temperature profile of the preform. Air temperatures and velocities for this cooling air can vary depending on damper settings, thus providing another variable in the process. Once the preform, exits the last bank of lamps, the cooling air flow across the preforms is removed and the heat transfer coefficient $h_c$ from the preform returns to the "ambient" value for "still" air of between 3 and 20 W/m$^2$–C depending on the preform velocity, ambient air temperature, and other parameters. It is in this ambient cooling region where the present invention is incorporated, as there are a few seconds of equilibration time before the preform is transferred to the blowing station. The temperature distribution just prior to inflation is what we are trying to determine as it will affect the final bottle properties.

Although it has traditionally been difficult if not impossible to measure the exiting preform temperature distribution, there are a number of control "knobs" available to the operator for modifying the heat input into the preform, e.g., changing the cooling air flow damper settings. Naturally higher airflows help to cool the outside surface of the preform relative to the inside surface. The most common control "knob" however involves modifying the voltage to the different heater banks. For any given bank, some lamps can be turned on or off. Furthermore, the overall wattage of energy from one or all of the banks can be varied as needed. As an example, the last few banks prior to blowing might be turned off completely to allow more equilibration time prior to inflation. Nevertheless, even with all of these knobs available for altering the temperature profile, there has previously been no way to fully quantify their effects on the preform temperature distribution. The present invention solves that problem.

The Mathematical Algorithm

The novel mathematical algorithm provided by the present invention is essential for determining the temperature profile through the thickness of the preform. There is much speculation as to "shape" of this profile. Although not bound by theory, it is believed that the profile shape is a near "cosine" wave shape, actually ½ of a cosine wave, immediately after the preforms exit the heat station. This cosine wave shape will be slightly distorted depending on damper settings, lamp profiles, and other reheat settings. The temperature is usually highest near the outside surface (x=0) and decreases towards the inside surface (x/L=1).

As the preform temperature is allowed to equilibrate under ambient conditions, e.g. the space between exiting the heat station and entering the blow mold station, the temperature curve begins to flatten. The time it takes to flatten increases with the thickness of the preform and is a function of various material properties such as the heat capacity Cp, conductivity k, and density ρ. In fact, it can be shown through standard heat transfer modeling that there exists a fundamental "thermal relaxation time" that can be used to estimate the amount of time it takes the preform temperature to equilibrate. This relaxation time τ is calculated as L$^2$ρCp/kπ, where L is the preform thickness, ρ is the density, Cp is the heat capacity, and k is the thermal conductivity. Thus, as the preform gets thicker, it takes longer for the temperature to equilibrate. A typical relaxation time for a standard 2 liter preform around 150 mils thick to equilibrate is about 10 seconds. It is, therefore, ideal to have at least this much equilibration time between heating and blow molding to ensure a flat temperature distribution.

The fact that the temperature distribution is nearly equal to a cosine wave with a wavelength approximately that of the preform thickness is supported by Fourier mathematics. This wavelength represents the longest wavelength or "fundamental harmonic" of the system, and as such, it has the longest relaxation time. Other shorter wavelength functions will dampen out much more quickly (i.e. shorter relaxation times) and can usually be neglected during the preform equilibration stage. Understanding this principle is critical to developing the novel algorithm of the present invention.

Heat Transfer Solution for the Preform During Ambient Cooling

The development of the novel algorithm and therefore the ability to determine the temperature distribution in the preform starts with heat transfer mechanics. For one-dimensional heat transfer in a slab, the governing heat equation is:

$$\frac{\partial T}{\partial t} = \alpha \frac{\partial^2 T}{\partial x^2} \tag{1}$$

where t represents time and x represents the position in the preform thickness direction. The term α is the thermal diffusivity defined as k/ρCp. As in FIG. 2, x=0 is the outside surface of the preform and x=L is the inside surface. Curvature effects have been omitted because the error associated with them is small (<5%) and incorporating them would require the inclusion of a number of more complicated Bessel's functions. Nevertheless, curvature effects could be included in the present invention, with added computational expense, if the added accuracy was desired.

The solution to Equation (1) can be obtained by standard separation of variable techniques with the exact form of the solution depending on the boundary conditions using routine derivations well know to skilled artisans, E. Kumpinsky, Ind. Eng. Chem. Res. 32, (1993), 2866. Before determining the solution, however, the boundary conditions must be specified. For the present problem of a preform cooling between heaters and blow mold, a convection boundary condition (coefficient h and ambient air temperature Tc) is assumed on the outside surface and an adiabatic condition on the inside surface (due to minimal heat loss to the inside): These boundary conditions can be written mathematically as $$h(T-T_c)=-k\, dT/dx \{\text{at } x=0\} \tag{2a}$$

$$dT/dx=0 (\text{adiabatic})\{\text{at } x=L\} \tag{2b}$$

The preform is assumed to have an unknown initial temperature distribution $T_o(x)$. This temperature distribution $T_o(x)$ is the through-the-thickness temperature distribution that the present invention is trying to determine. In other words, it is the temperature distribution of the preform after it has exited the heat station and before it has entered the blow mold station. The attempt to determine the initial temperature profile based on further cooling data should further help to clarify why the present algorithm is an "inverse" algorithm.

With the above conditions, the solution for T(x,t) with further cooling can be calculated using techniques known to skilled artisans, e.g., E. Kumpinsky, *Ind. Eng. Chem. Res.* 32, (1993), 2866)

$$T(x,t) = Tc + \sum_{n=1}^{\infty} A_n e^{-\frac{2}{\tau_n}\alpha t} v_n(x) \tag{3}$$

where Tc is the ambient air temperature, $v_n$ is the n$^{th}$ eigenvector, defined as $$v_n(x) = \sin(z_n x) + \frac{z_n k}{h_c}\cos(z_n x) \qquad (4)$$

and $z_n$ are the eigenvalues determined from the transcendental equation $$\tan(z_n L) = \frac{h_c}{k z_n} \qquad (5)$$

If the initial temperature distribution $T(x, t=0)$ is known, then the front factors $A_n$ can be determined by standard Fourier mathematics and certain orthogonality relationships, $$A_n = \frac{\int_0^L (T(x, 0) - Tc) * v_n(x)\, dx}{\int_0^L v_n^2(x)\, dx} \qquad (6)$$

To solve the problem of determining the temperature distribution throughout the thickness of a preform, however, $T(x,0)$ is not known and is ultimately what must be determined according to the present invention.

Equation (3) has an infinite number of roots, one for each value of n. The greater the number of roots determined, the greater the accuracy of the solution (typically expansion of only a few terms are needed for a reasonably smooth solution curve). The term $v_n(x)$ represents the n'th eigenvector for the solution. The importance of these eigenvectors to the inverse solution strategy will become more apparent in a later section.

The eigenvalue $z_n$ calculated from Equation (5) increases in magnitude with increasing n. From Equation (4), it is shown that the eigenvectors will be higher in frequency (short wavelength) with increasing n. Furthermore, careful inspection shows that the exponential term in Equation (3) will decay more quickly with increasing n. Basically, these higher frequency variations in temperature will decay very quickly leaving a low frequency (the fundamental harmonic frequency or cosine wave) profile. As shown previously, the reciprocal of $z_n^2 \alpha$ is the $n^{th}$ thermal relaxation time. For a 144 mil PET preform, the relaxation times are of the order of 600s, 14s, 4s and 1.6s for n=1, 2, 3 and 4 respectively. Thus, the $4^{th}$ term in the expansion will have completely damped down to near zero within only a few seconds of starting a measurement and will thereby not affect the cool-down curve past that time. Since it usually takes about one to two seconds before temperature data can be acquired, terms higher than about n=4 will have negligible effect and can be disregarded. Consequently, great accuracy can be achieved in our prediction with only the first few terms in the series.

It is important to clarify a number of important features about this heat transfer solution. First, the assumption was made that the inside surface (x=L) is adiabatic and that no heat transfer occurs here. This is because the air inside the preform wall is trapped and cannot circulate. Because of this, the air temperature inside the preform is very close to that of the inside wall of the preform so there is very little heat transfer. Use of this assumption is not required, but it makes the development of the algorithm much simpler without any significant loss of accuracy.

The heat transfer coefficient hc on the outside (x=0) represents the rate of cool-down of the outside air for its given surroundings. Typically, the preforms are not moving very quickly and there is very little air flow so values of h for ambient cooling of a vertical cylinder can be used. In the actual prototype of the invention, h was varied as a means for "fine-tuning" the instrument.

Development of the Inverse Formulation

The inverse approach herein can be thought of as a type of curvefit with the boundary conditions used as the "datapoints" to be curve-fit. As is well known with curvefitting, the number of "datapoints" available limits the number of unknowns that can be solved in the curvefit. For example, if only two data points are available, one could only fit 2 unknowns. In the present invention, the unknowns represent the values of $A_n$ and the datapoints are the outside surface preform temperature as a function of time. The latter can be written from Equation (3) by substituting x=0

$$T(0, t) = Tc + \sum_{n=1}^{\infty} A_n e^{-z_n^2 \alpha t}(z_n k/h). \qquad (7)$$

Typically, only 2 to 4 terms of the series expansion are needed (and hence 2 to 4 unknown values for $A_n$) to accurately predict the temperature profile. The outside temperature $T(0,t)$, can be easily measured as a function of time via a variety of methods known in the art. With this temperature data, the values for $A_n$ can be curve fit using standard methods since Tc, $\alpha$, k, h, and the eigenvalues $z_n$ are already known. Once these coefficients are calculated, they can be plugged back into Equation (3) and the temperature through the thickness of the preform at any point x and any time t is now known. Thus, the temperature profile for the time when the preform reaches the blow station can be obtained by extrapolation to the appropriate time t.

In the lower limiting case, with only two outside temperature datapoints (e.g., an initial temperature at t=0 and one at a later time t2), Equation (7) can be solved with only two values for $A_n$ (n=2). Surprisingly, this minimal amount of data can give a reasonably good approximation of the temperature profile for most applications. Obviously, the more datapoints the better the result. However, the practical limitations of measurement can limit the number of datapoints available for use in the equation.

There are many strategies for curvefitting the equation but all fall under the basic premise that cool-down information obtained from the outside surface is used to extract the full temperature profile. Without this cool-down information, which is obtained by measuring preform outside surface temperatures at multiple times, the temperature profile information is not extractable.

Measurement Apparatus for the Present Invention

From the algorithm, it is clear that outside surface temperature data of the preform must be obtained as a function of time. This can be done using any technique known to skilled artisans.

In a preferred embodiment, the surface temperature measurements are made using some form of pyrometer or infrared temperature measuring device. This method does not perturb the surface temperature and the response times are quicker. However, other devices such as surface mounted thermocouples and platinum resistance thermometers ("PRTs") can also be used. Proper calibration of these devices for the preform substrate, e.g., polyester, is required and is within the purview of the skilled artisan.

In another embodiment, the method for measuring the surface cool-down rate comprises removing a hot preform from the RHB, placing it in front of a pyrometer, and measuring and recording the outside surface temperature as a function of time, preferably using some form of data acquisition system and display. The T(0,t) vs. t data can then be curvefit to solve for the unknown $A_n$s. Multiple pyrometers are mounted in an array to obtain surface temperature data at different points from top to bottom along the preform so that the full temperature profile can be obtained. Optionally, an additional pyrometer is mounted such that it measures the inside surface temperature at the same time. This measurement helps to serve as a check of the accuracy of the predictions. In other embodiments, IR camera(s) or line scanning units are used instead of individual pyrometers. These methods get a continuous range of cool-down data over virtually every point of the preform. The disadvantages of the method requiring removal of a preform are that it is slow and is not conducive to online process control. However, it is very inexpensive to build a device to accomplish his method and it is portable. Also, with controlled conditions, there is enough data from this method so that the unknowns hc and α can also be determined as part of the curve fit.

Figure 3:
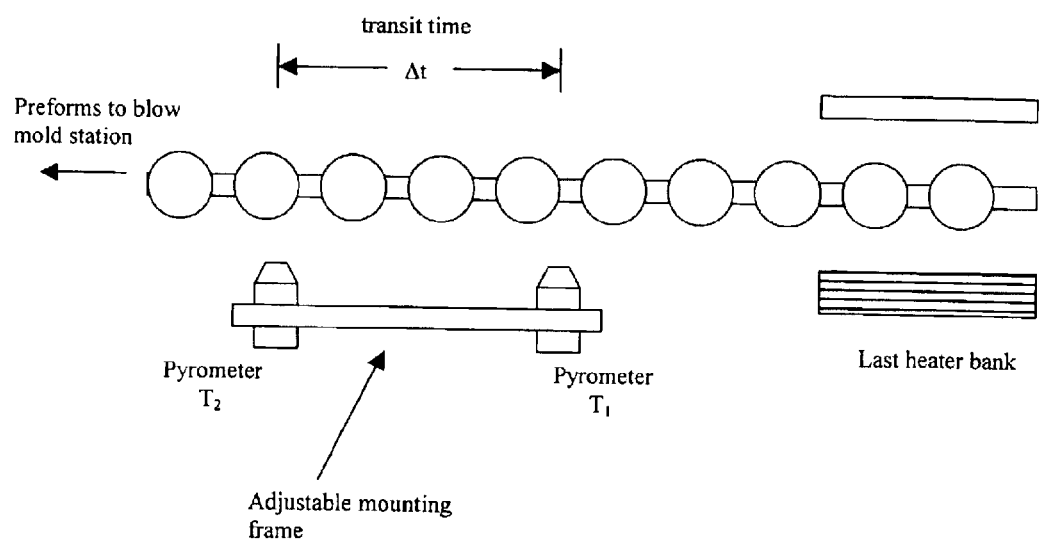
FIG. 3 is a schematic of a Sidel SB23 with two-pyrometer temperature measuring device used in the present invention.

In another embodiment, two or more pyrometers are mounted internally in the RHB as shown in FIG. 3. These pyrometers are focused so that they measure the preform temperature at different points along their traverse from the heat station to the blow mold station. Knowing the velocity of preforms moving between stations V and the distance between the spots where the pyrometers are focused Δy, the transit time Δt is equal to Δy/V. The difference in temperatures, divided by Δt provides a measure of the cool-down rate (dT/dt). Thus, for example, two pyrometers would provide two surface temperatures separated in time by Δt which is enough data to fit the two-term version of Equation 7. With additional pyrometers focused at different spots, more datapoints can be obtained leading to more accurate curve fitting. As described earlier, the cool-down rate (dT/dt) alone is useful for assessing how the inside temperature is varying with respect to the outside temperature. This can be used by itself as a feedback control parameter.

In addition, additional pyrometers can be mounted to focus on different parts of the preform (top to bottom) so that temperature distributions at different points on the preform can be calculated.

These temperature measurement instruments are mounted along the preform flow path but in between the heat station and the blow station. This permits cool-down rate between any two pyrometers (or other temperature measurement instruments) to be determined as the temperature difference between the pyrometers divided by the time it takes for the preform to traverse the distance between pyrometers. Many different arrangement of temperature data gathering pyrometer or other similar instrument arrays can be envision and are part of the present invention.

The advantages of using pyrometers or other similar temperature measuring instruments are low cost and the ability to give real-time data without removing preforms from the manufacturing process. This allows for the possibility of closed-loop, feedback control of the reheat process. The disadvantages of this approach are that accurate calibration of each pyrometer is required to eliminate biases in the measurements and that the response time of many of the pyrometers is too slow for some of the high speed commercial RHBs.

In another preferred embodiment, an infrared camera or line scanning pyrometer is mounted into or onto the RHB. The camera or scanner instantly measures the preform temperatures over a wide field of view with a fast response time. This method and device avoids the calibration/bias issues when multiple pyrometers are used. With the camera, preform outside surface temperature data is obtained for the whole preform. This means that the through-the-thickness temperature distribution can be calculated at all points on the preform.

With the camera, multiple preforms can be captured within the field of view for a single picture. Knowing the spacing between preforms and the velocity of the preform as it moves through the RHB, the Δt between preforms can be calculated. Thus, each preform in the field of view provides a temperature datapoint that can be used for the curvefit.

While other embodiments are possible, the important factor for the present invention is that they measure surface cool-down for the preform as a function of time. Preferably, multiple temperature measurements are made and averaged to reduce signal to noise ratio. These averages are used in the determination made by the present invention.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Measurements Using an Offline Pyrometer Assembly

Figure 4:
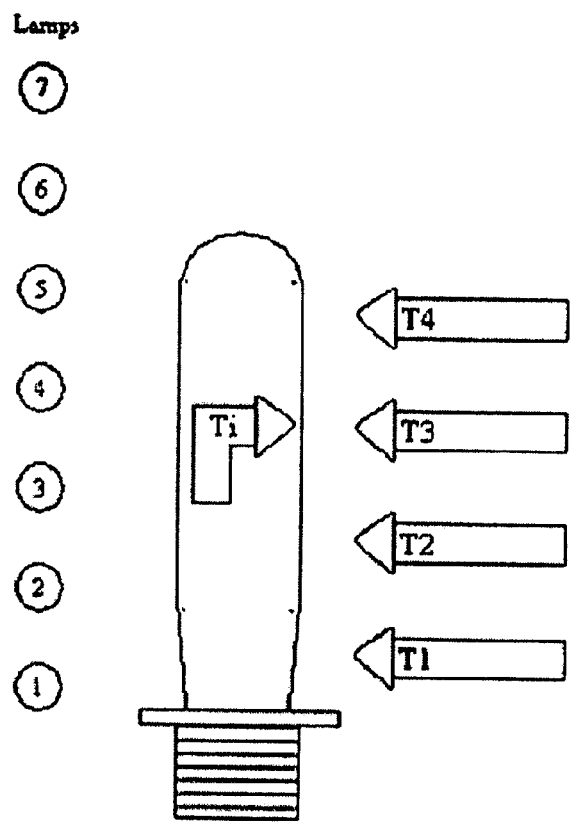
FIG. 4 shows a configuration of pyrometers relative to lamp and preform in Example 1.

Polyester preforms (Eastman PET CB12 available from Eastman Chemical Company, Kingsport, Tenn.) with a thickness of 144 mils were heated under varying conditions using a laboratory RHB. The lab unit consisted of a single heater bank with 8 quartz heating rods. At the end of reheat, the preforms were removed and the temperature recorded as a function of time. The time for transfer from RHB to measuring station took approximately 5 seconds after which data recording was started using a LabVIEW data acquisition system and laptop computer. Temperature measurements were made using 4 pyrometers (T1 through T4) mounted in a vertical array, each focusing at a different position on the preform (see FIG. 4). A fifth pyrometer with a 90 degree angle bend was inserted inside the preform and measured the inside temperature at a point close to T3. All pyrometers were blackbody calibrated and had emmisivity settings of 0.95. The inside pyrometer was also corrected for internal background reflection, and temperature drift due to it being inside a hot radiating source. Temperature error for the pyrometers was approximately +/−2° C. All data was fed to a LabVIEW data acquisition system where it was processed and displayed on screen. Values of Tc=23° C., α=0.95e−3 cm$^2$/s and h/k=0.65 cm$^{-1}$ were assumed.

Figure 5:
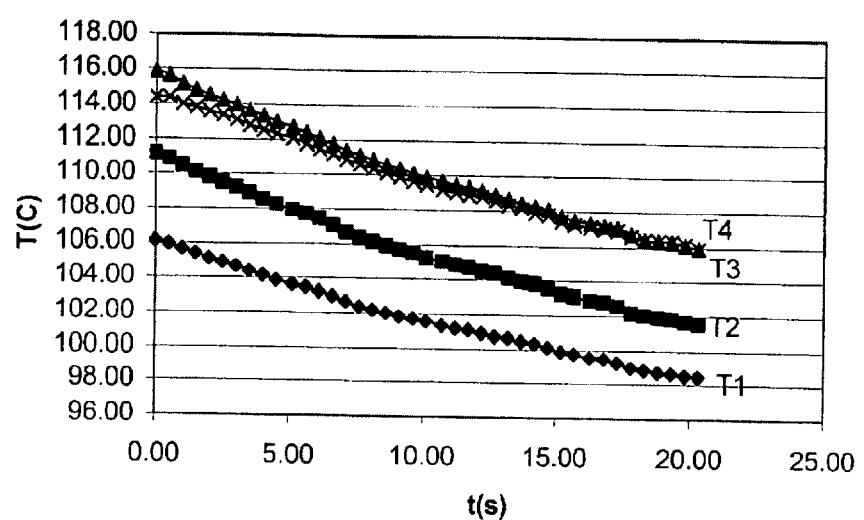
FIG. 5 shows temperature cool-down curves (outside surface) for Example 1, Run 1.
Figure 6:
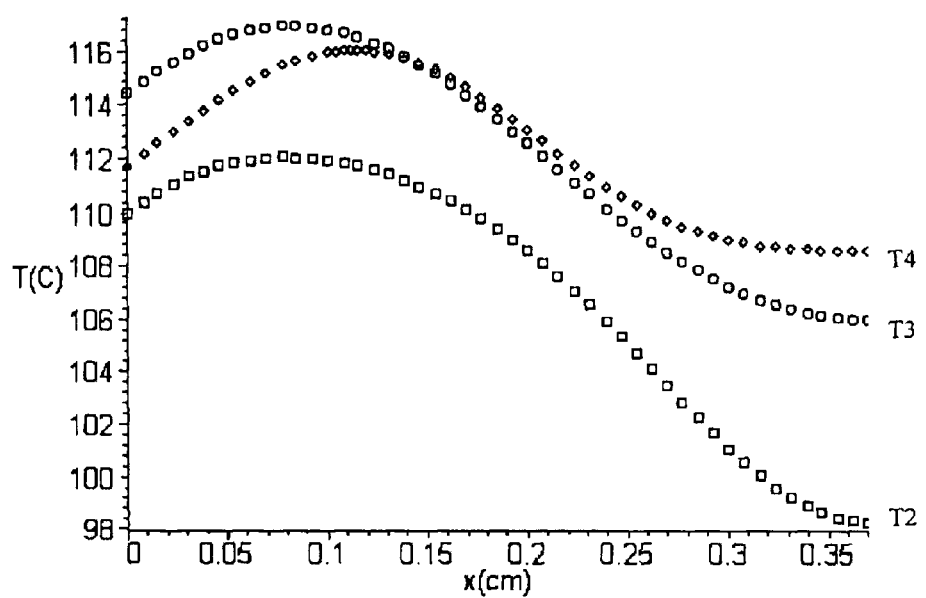
FIG. 6 shows predicted temperature profiles for different locations in Example 1, Run 1 at t=0s.

Run 1, which was the centerpoint, consisted of a 67 second reheat time with all lamps set at a rheostat setting of 75% of maximum. In Run 2, the reheat time was increased to 77s. In Run 3, the lamp voltage was increased to 85% (reheat time=67s). The cool-down data was curvefit to a 4 term version of Equation (7) having four unknowns (A1 through A4). Values for $A_n$ extracted from this curvefit, along with measured and predicted inside temperatures are listed in Table 1. Sample cooling data for Run 1 are shown in FIG. 5. The first four roots $z_n$, for the 144 mil preform 0.37 cm) are 1.27, 8.7, 17.1 and 25.5. The predicted temperature profiles for Run #1 at time 0s are shown in FIG. 6.

Figure 7:
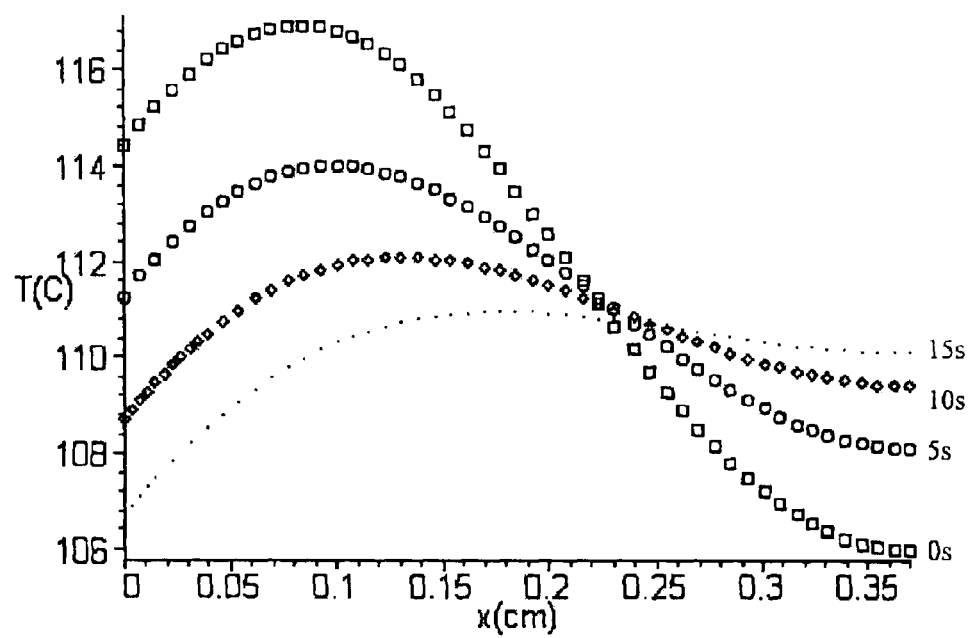
FIG. 7 shows predicted temperature profiles for Run 1 in Example 1 after different times.

As observed, the bottle is hotter toward the top of the preform. This is in agreement with the blow molding experiments that showed very slight pearlescence near the finish area. For further comparison, the temperatures of T3, Run1 are extrapolated to different times (besides t=0) in FIG. 7. Actual blow molding took place approximately 15s after heating so this would be the more useful predictive point.

Run 4 involved increasing the lamp voltage of one of the 8 lamps, to 95%. The lamp in question is near the finish area of the preform (close to T2). This causes the T2 inside area to heat up an additional 11° C. as compared with Run 1. The T4 area, which was farthest from the hotter lamp, only heats up on the inside surface by about 6° C.

As observed, all of the predictions match well with the experimentally measured inside temperatures, thus confirming the accuracy of the model. Furthermore, this data helps to provide a much better understanding of how a given change in reheat condition can dramatically affect the overall temperature profile.

TABLE 1

Summary of Data Fitting for Example 1

| 1 | 67 s reheat time 75% lamp | T2 | 39.6 | 0.76 | −0.048 | 0.011 |       | 98    |
|---|---|----|------|------|--------|--------|-------|-------|
|   |   | T3 | 42   | 0.71 | −0.007 | −0.004 | 105.4 | 106   |
|   |   | T4 | 42.1 | 0.54 | −0.018 | −0.017 |       | 108.5 |
| 2 | 77 s reheat time 75% lamp | T2 | 44.7 | 0.72 | −0.007 | −0.002 |       | 112   |
|   |   | T3 | 46.7 | 0.89 | −0.06  | 0.006  | 116.1 | 115.5 |
|   |   | T4 | 46.9 | 0.71 | −0.063 | −0.015 |       | 117   |
| 3 | 67 s reheat time 85% lamp | T2 | 47.5 | 0.76 | 0.003  | −0.008 |       | 118   |
|   |   | T3 | 50.1 | 0.83 | 0.06   | −0.004 | 121   | 123   |
|   |   | T4 | 49.8 | 0.63 | −0.04  | −0.008 |       | 123.5 |
| 4 | 67 s reheat time All lamps at 75% except near finish at 95% | T2 | 44.2 | 0.86 | −0.02  | −0.008 |       | 109   |
|   |   | T3 | 46.1 | 0.83 | 0.01   | −0.028 | 113   | 114.6 |
|   |   | T4 | 46   | 0.74 | 0.018  | −0.022 |       | 116   |

EXAMPLE 2

Measurements on a Sidel SBO-23 Using an Agema IR Camera

Figure 8:
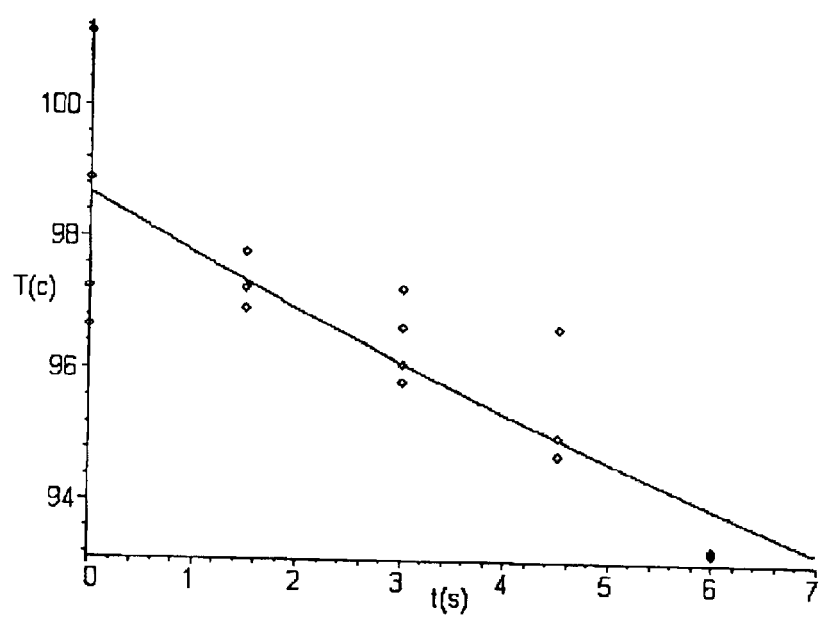
FIG. 8 depicts temperature data vs. effective cooling time from the IR camera in Example 2.

Blow molding trials were performed on a Sidel SBO23 reheat blow molder using 2 liter, PET preforms having a wall thickness of 158 mils. A thermal imaging camera (Agema) was used to take infrared ("IR") snapshots of the preforms as they exited the lamps but prior to molding. Within the field of view, 5 preforms were visible, so effectively 5 datapoints in "time" could be extracted. Five IR pictures were taken per run. The surface temperature was extracted from the digital image, and plotted as a function of time (converted from position and velocity). See FIG. 8 as an example. For the sake of brevity only temperatures at the midpoint (top to bottom) of the preform are discussed, although temperatures from all points on the surface could be used. Bottle throughput rate was 2400 per hour, and from this, the time increment between preforms in the IR photo was 1.5 s. A handheld pyrometer was inserted into the mouth of an ejected preform to provide an estimate of the inside surface temperature.

The data is compiled in Table 2 for Runs 5 through 8. Run 5 represents a nominal set of reheat lamp conditions with a total power setting of 66%. The air damper setting was set at 70% so a high degree of airflow was present during the heating. Run 6 was the same except the damper was set at 35% representing a low airflow. Run 7 had a damper setting of 50%. In Run 8, the damper setting was returned to 70% but the total power was increased to 80%.

Because of the greater noise in the data (see FIG. 8), only a 2 term (n=2) series was used for the fitting. With more data, a higher order fit could have also been made. The value of thermal diffusivity was 0.95e−3 $cm^2/s$, and h/k was 1.2 $cm^{-1}$. This resulted in eigenvalues of 1.59 and 8.1. The reason h/k is higher than in Example 1 is because there is some residual air flow, and the preforms are spinning, within the Sidel equilibration area. Ambient air temperature inside the Sidel was approximately 27° C.

The internal temperature measurements with the handheld pyrometer were made after the perform was ejected. Estimated error was +/−4° C. due to the variability in focus point of the unit and its sensitivity to ambient temperature. The inside measurement occurred about 15 seconds from the time the preforms first left the heaters. Therefore the predicted values in Table 2 are based on a 15 s time lag.

Figure 9:
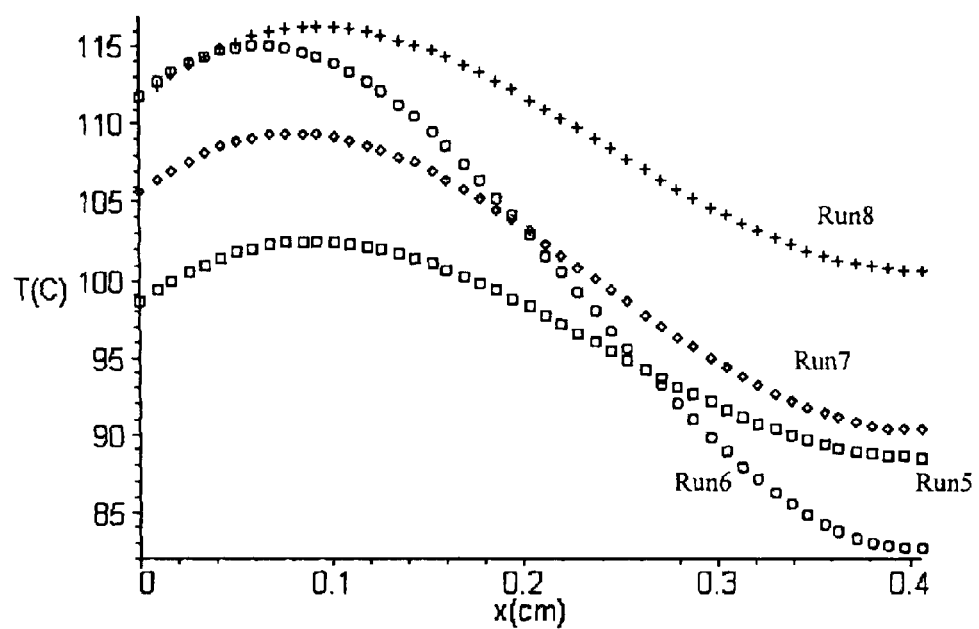
FIG. 9 shows predicted temperature profiles for Example 2.

Calculated temperature profiles at t=0 s are shown in FIG. 9. Runs 5 through 7 all have approximately the same inside temperature within experimental error. This is expected since the only difference was in the air cooling. This cooling is not expected to affect the heat gain on the inside surface. However, the outside surface is found to be much lower for the higher air flow condition (Run 5) as expected. Run 8 involved a higher overall power setting and resulted in a temperature rise all the way through the preform. The predictions of the model not only match what is expected, but also are in agreement with the internal temperature measurements within experimental error. The data from Example 2 is shown in Table 2.

TABLE 2

| Run | Description | A1 | A2 | $T_{in}$ ° C. (experiential) | $T_{in}$ ° C. (predicted) |
|---|---|---|---|---|---|
| 5 | 66% power, 70% damper | 44.6 | 1.8 | 93.7 | 94 |
| 6 | 66% power, 35% damper | 47.1 | 3.3 | 98.6 | 93.5 |
| 7 | 60% power, 50% damper | 47.6 | 2.3 | 94.9 | 97 |
| 8 | 80% power, 70% damper | 53.0 | 2.1 | 104.4 | 106 |

EXAMPLE 3

Measurements Using a Series of Pyrometers Mounted in a Sidel SBO-23

Four infrared pyrometers were mounted in series on an adjustable metal bar and clamped into the RHB as in FIG. 3. The total spacing between the first and last pyrometer was 9.5 inches and the throughput rate of preforms was 2400 bottles per hour such that the time for a perform to traverse between the pyrometers was approximately 6 seconds. Because there were 4 pyrometers, 4 datapoints in "time" were effectively determined. A LabVIEW™ data acquisition system and computer were connected to the pyrometers to collect the pyrometer data and perform the calculations. All pyrometers were calibrated to the same blackbody source. Run conditions were similar to Run 5 of Example 2. Similarly, input parameters for the predictive model were also assumed to be the same.

The model predicted the inside temperature to be very similar to that of Run 5, with the inside temperature after 15 seconds being 97.8° C. The measured value was 97° C. ±4° C. which is in agreement with model predictions. This example shows that the present invention is functional for a multiple pyrometer setup mounted to a RHB.

In the drawings and specification, there have been disclosed typical preferred embodiments of the invention, and although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A method for determining the temperature distribution throughout the thickness of a preform used in a container reheat stretch blow molding process, comprising:

measuring the outside surface temperature of the preform at least two times during the period the preform is cooling down after exiting the heat station and before entering the blow molding station; and calculating the temperature distribution throughout the thickness of the preform based upon the measured outside surface temperatures using an algorithm comprising:

curve fitting the measured outside surface temperatures to solve for $A_n$ using an equation having the formula $$T(0, t) = Tc + \sum_{n=1}^{\infty} A_n e^{-z_n^2 \alpha t}(z_n k / h)$$

and using the $A_n$ values to calculate the through-the-thickness temperature distribution for the preform using an equation having the formula $$T(x, t) = Tc + \sum_{n=1}^{\infty} A_n e^{-z_n^2 \alpha t} v_n(x),$$

where T(x,t) is the through-the-thickness temperature distribution of the present invention, T(0,t) is the outside temperature as a function of time t which is curvefit to the experimental data to determine the unknown front factors $A_n$, Tc is the ambient air temperature, e is the exponential equal to 2.718, $v_n$ are the eigenvectors for the nth eigenvalue $z_n$, k is conductivity, x is the depth of the preform from the outside surface, and $\alpha$ is the thermal diffusivity.

2. The method of claim 1 wherein the temperature distribution throughout the thickness of the preform is calculated using a computer programmed to compute the temperature distribution using the algorithm.

3. The method of claim 1 wherein the preform comprises a polymer selected from the group consisting of polyester, copolyester, nylon, polycarbonate, acrylonitrile, polyvinyl chloride, polyolefins, ethylene-vinyl alcohol, styrenics, and combinations thereof.

4. The method of claim 1 wherein the preform is selected from the group consisting of polyester preforms and copolyester preforms.

5. A preform having a temperature distribution optimized for the production of high quality containers based upon the temperature distribution calculated using the method of claim 1.

6. The preform of claim 5 comprising a polymer selected from the group consisting of polyester, copolyester, nylon, polycarbonate, acrylonitrile, polyvinyl chloride, polyolefins, ethylene-vinyl alcohol, styrenics, and combinations thereof.

7. The preform of claim 5 selected from the group consisting of polyester preforms and copolyester preforms.

8. A device for determining the temperature distribution throughout the thickness of a preform used in a container reheat stretch blow molding process from temperature measurements taken from the outside surface of the preform, comprising:

a temperature measuring means for measuring the outside surface temperature of the preform at least two times during the period the preform is cooling down after exiting the heat station and before entering the blow molding station, wherein the temperature measuring means is coupled to a calculating means capable or receiving temperature data from the temperature measuring means; and a calculating means for calculating the temperature distribution throughout the thickness of the preform based upon the measured outside surface temperatures, wherein the calculating means receives outside surface temperature data from the temperature measuring means and calculates the preform temperature distribution using an algorithm comprising:

curve fitting the measured outside surface temperatures to solve for $A_n$ using an equation having the formula $$T(0, t) = Tc + \sum_{n=1}^{\infty} A_n e^{-z_n^2 \alpha t}(z_n k / h)$$

and using the $A_n$ values to calculate the through-the-thickness temperature distribution for the preform using an equation having the formula $$T(x, t) = Tc + \sum_{n=1}^{\infty} A_n e^{-z_n^2 \alpha t} v_n(x),$$

where T(x,t) is the through-the-thickness temperature distribution of the present invention, T(0,t) is the outside temperature as a function of time t which is curvefit to the experimental data to determine the unknown front factors $A_n$, Tc is the ambient air temperature, e is the exponential equal to 2.718, $v_n$ are the eigenvectors for the nth eigenvalue $z_n$, k is conductivity, x is the depth of the preform from the outside surface, and $\alpha$ is the thermal diffusivity.

9. The device of claim 8 wherein the temperature measuring means is selected from the group consisting of pyrometers, thermocouples, and infrared cameras.

10. The device of claim 8 wherein the temperature measuring means is one or more infrared cameras.

11. The device of claim 8 wherein the temperature measuring means is a pyrometer array.

12. The device of claim 8 wherein the calculating means is a computer programmed to compute the temperature distribution using the algorithm.

13. The device of claim 8 further comprising a displaying means for communicating the calculated temperature distribution in a human readable format.

14. A method for manufacturing high quality containers using a reheat stretch blow molding process, comprising:

determining the temperature distribution throughout the thickness of a preform used to manufacture containers using a method comprising:

measuring the outside surface temperature of the preform at least two times during the period the preform is cooling down after exiting the heat station and before entering the blow molding station in the blow molding machine;

calculating the temperature distribution throughout the thickness of the preform based upon the measured outside surface temperatures using an algorithm comprising:

curve fitting the measured outside surface temperatures to solve for A, using an equation having the formula $$T(0, t) = Tc + \sum_{n=1}^{\infty} A_n e^{-z_n^2 \alpha t}(z_n k/h)$$

and using the $A_n$ values to calculate the through-the-thickness temperature distribution for the preform using an equation having the formula $$T(x, t) = Tc + \sum_{n=1}^{\infty} A_n e^{-z_n^2 \alpha t} v_n(x),$$

where $T(x,t)$ is the through-the-thickness temperature distribution of the present invention, $T(0,t)$ is the outside temperature as a function of time t which is curvefit to the experimental data to determine the unknown front factors $A_n$, Tc is the ambient air temperature, e is the exponential equal to 2.718, $v_n$ are the eigenvectors for the nth eigenvalue $z_n$, k is conductivity, x is the depth of the preform from the outside surface, and $\alpha$ is the thermal diffusivity;

using the calculated temperature distribution to adjust the heating elements used to heat preforms in the heat station to obtain a desired preform temperature distribution; and blow molding the preforms into containers.

15. A container made according to the method of claim 14.

16. The container of claim 14 comprising a polymer selected from the group consisting of polyester, copolyester, nylon, polycarbonate, acrylonitrile, polyvinyl chloride, polyolefins, ethylene-vinyl alcohol, styrenics, and combinations thereof.

17. The container of claim 14 selected from the group consisting of polyester containers and copolyester containers.

18. A reheat stretch blow molding machine, comprising:

a heat station where preforms are heated;

a blow molding station where the preforms are converted to containers;

a means for transporting heated preforms from the heat station to the blow molding station at an essentially uniform rate;

a temperature measuring means for measuring the outside surface temperature of a preform at least two times during the period the preform is cooling down after exiting the heat station and before entering the blow molding station, wherein the temperature measuring means is coupled to a calculating means capable or receiving temperature data from the temperature measuring means; and a calculating means for calculating the temperature distribution throughout the thickness of the preform based upon the measured outside surface temperatures, wherein the calculating means receives outside surface temperature data from the temperature measuring means and calculates the preform temperature distribution using an algorithm comprising:

curve fitting the measured outside surface temperatures to solve for $A_n$ using an equation having the formula $$T(0, t) = Tc + \sum_{n=1}^{\infty} A_n e^{-z_n^2 \alpha t}(z_n k/h)$$

and using the $A_n$ values to calculate the through-the-thickness temperature distribution for the preform using an equation having the formula $$T(x, t) = Tc + \sum_{n=1}^{\infty} A_n e^{-z_n^2 \alpha t} v_n(x),$$

where $T(x,t)$ is the through-the-thickness temperature distribution of the present invention, $T(0,t)$ is the outside temperature as a function of time t which is curvefit to the experimental data to determine the unknown front factors $A_n$, Tc is the ambient air temperature, e is the exponential equal to 2.718, $v_n$ are the eigenvectors for the nth eigenvalue $z_n$, k is conductivity, x is the depth of the preform from the outside surface, and $\alpha$ is the thermal diffusivity, and wherein the calculating means is coupled to the heat station such that the calculating means can adjust the heat station heating elements based upon the calculated preform temperature distribution and control the temperature distribution throughout the thickness of a preform in the heat station.

19. The machine of claim 18 wherein the temperature measuring means is selected from the group consisting of pyrometers, thermocouples, infrared cameras, and infrared linescanning cameras.

20. The machine of claim 18 wherein the temperature measuring means is one or more infrared cameras.

21. The machine of claim 18 wherein the temperature measuring means is a pyrometer array.

22. The machine of claim 18 wherein the calculating means is a computer programmed to compute the temperature distribution using the algorithm.

23. The machine of claim 18 further comprising a displaying means for communicating the calculated temperature distribution in a human readable format.

* * * * *

UNITED STATES PATENT AND TRADEMARK OFFICE
CERTIFICATE OF CORRECTION

PATENT NO. : 6,839,652 B2
DATED : January 4, 2005
INVENTOR(S) : Shelby et al.

It is certified that error appears in the above-identified patent and that said Letters Patent is hereby corrected as shown below:

Column 17,
Line 2, "A" should read -- $A_n$ --.

Signed and Sealed this

Nineteenth Day of April, 2005

JON W. DUDAS
*Director of the United States Patent and Trademark Office*